Patented Nov. 8, 1927.

1,648,577

UNITED STATES PATENT OFFICE.

HARRY P. CORSON, OF LAKEWOOD, OHIO, ASSIGNOR TO THE GRASSELLI CHEMICAL COMPANY, OF CLEVELAND, OHIO, A CORPORATION OF OHIO.

INSECTICIDE AND PROCESS OF MAKING THE SAME.

No Drawing.   Application filed September 29, 1924. Serial No. 740,626.

This invention relates to the preparation of brown colored products comprising a compound or compounds of manganese and arsenic and suitable for use as insecticides.

In an application Serial Number 654,781, filed July 30, 1923, in the name of Wellington Lee Tanner, there is described a process for the preparation of manganese arsenate or a product containing manganese arsenate by causing a compound of manganese, such as manganese dioxid, to react with arsenious oxid in the presence of water and preferably also in the presence of a catalyst such as nitric acid.

The process of the present invention is an improvement in or a modification of the process of said application and is designed particularly for the production of a brown colored manganese-arsenate-containing product in such form and of such an arsenic content and solubility as to render it suitable for use as an insecticide.

Manganese dioxid and arsenous oxid react at elevated temperature in the presence of water, as indicated in the reaction equation—

$$2MnO_2 + As_2O_3 + H_2O = 2MnHAsO_4$$

The compound $MnHAsO_4$ formed in accordance with this reaction is white, but the reaction product may vary in color from a light or whitish color to gray or even black with some brownish coloration. The gray or black color is attributed to the presence in the product of uncombined manganese dioxid which may be due to the use in the peparation of the reaction mixture of a quantity of manganese dioxid in excess of that capable of reacting with the arsenious oxid. Any brown color in the product may be attributed to natural impurities in the raw materials or to colored compounds formed by the decomposition either of the raw materials or of the $MnHAsO_4$ with the liberation of brown hydrated oxides or hydroxides of manganese. Such decomposition (with the production of a brown coloration) apparently may occur only as a result of abnormal operating conditions such as local overheating of the reaction mixture.

In carrying out the foregoing reaction in a commercial way, using pyrolusite as the source of manganese dioxid and commercial white arsenic as the source of arsenious oxid, there may be present in the reaction product a relatively small quantity of trimanganoarsenate due to the presence of manganese monoxid in the pyrolusite. This compound also is white in color. Consequently the interaction of manganese dioxide with arsenious oxid does not in itself afford a reliable method for the production of a brown colored product.

I have discovered that by treating the reaction product of manganese dioxid or a material containing the same, such as pyrolusite or a similar oxidized manganese ore, and arsenious oxid with a basic material such as calcuim hydroxide a brown colored product may be obtained. The brown coloration may be attributed to brown colored compounds of manganese produced by the interaction of the manganese arsenate with the basic material. Apparently calcium hydroxide reacts with the manganese arsenate, forming calcium arsenate and manganese hydroxide and the manganese hydroxide is converted by oxidation, with or without accompanying dehydration, to brown colored hydroxides or hydrated oxides.

In accordance with my invention pyrolusite and white arsenic are first caused to react by heating a water slurry thereof in combining proportions, the reaction being continued to practical completion, that is, until substantially all of the arsenic is fixed as insoluble arsenate. This reaction preferably is carried out in the presence of a catalyst such as nitric acid, although it may be carried to completion in a considerably longer time without a catalyst.

The solid reaction product is then treated with an alkaline agent. For this purpose dry lime or a slurry of calcium hydroxide in water is added either directly to the reaction mixture or to a slurry of the separated solid reaction product in water and the resulting mixture is digested until the desired color is produced. This may require heating to about boiling temperature with agitation for up to 24 hours or longer, the color change being gradual from substantially white to cream color and finally to a dark brown. It is noted, however, that the reaction between the lime and the manganese arsenate will proceed to completion without heating if time enough is allowed and that the higher the temperature to which it is heated the more rapidly the reaction will proceed. It is therefore preferable, but not essential, to heat it as hot as is possible in an open tank, namely to about 100° C. Heating in an autoclave at a higher temperature under pressure will still further accelerate the reaction, but materially increase the cost of the plant. The quantity of alkali to be used depends upon the arsenic content of the material and the color desired. Quicklime in quantity equivalent to 10% of the combined weights of the manganese dioxid and white arsenic used has been found to produce a satisfactory dark brown color. Smaller amounts give lighter brown colors. After the desired color is reached the reaction mixture is filtered and the solid product washed, dried and ground to a powder.

The following description of a typical run carried out under my preferred conditions illustrates the process of my invention:

50 pounds of ground pyrolusite containing the equivalent of 67% MnO and 14.3% of available oxygen and 45 pounds of commercial white arsenic are mixed with 80 to 90 gallons of water containing the equivalent of 3 pounds of 42° Bé. nitric acid. The mixture is stirred vigorously at boiling temperature for about 18 hours after which 10 pounds of quicklime either in the form of crushed rock lime or a slurry of an equivalent amount of slaked lime in water are added and the stirring and heating continued for, say, 24 hours. The resulting mixture is then filtered and the solid product washed, dried and ground. The finished product so formed is a brown powder resembling cocoa, the following being a typical analysis:

| | Per cent. |
|---|---|
| Total arsenic, $As_2O_5$ | 42.5 |
| Arsenious oxid, $As_2O_3$ | 0.00 |
| Water soluble arsenic, $As_2O_5$ | 2.36 |

Density by Coad densimeter, 78 cu. in. per lb.

The composition and general properties of the product indicate that it is suitable for use as an insecticide. The product suspends well in water and has physical properties which make it well adapted for application as an insecticide either in the form of dust or in the form of a spray. Its brown color is a special asset in its use as an insecticide for tobacco and the like.

As indicated in the foregoing description my preferred procedure involves the use of pyrolusite and commercial white arsenic as starting materials, nitric acid as a catalyst and lime as the alkaline agent for the production of the brown color, and the preferred reaction conditions involve the use of the pyrolusite and white arsenic in proportions corresponding to the combining weights of their manganese dioxid and arsenious oxid contents as indicated in the equation, the use of a relatively small quantity of the catalyst amounting to about 3% of the combined weights of the manganese dioxid and arsenious oxid, the use of water in quantity sufficient to form a suitable slurry, and the use of a quantity of lime amounting to about 10% of the combined weights of the manganese dioxid and arsenious oxid. These specific conditions are capable of considerable variation. The quantity of catalyst used may be varied or its use may be omitted or a variety of catalytic agents other than nitric acid may be used, as for instance nitrobenzene, picric acid, acetic acid, formic acid, hydrofluosilicic acid, sulfuric acid, products of hydrocarbons, metal nitrates, such as manganese nitrate, and the alkali and alkaline earth metal nitrates, etc. The catalyst may be made to serve repeatedly by using the mother liquor from one batch of product for the preparation of a new reaction mixture. In the specific example given the liquor will contain calcium nitrate which may serve as the catalyst for the reaction of a new batch of pyrolusite and white arsenic.

Pyrolusite is the logical source of supply of the manganese component of the product, but it may be substituted by other materials containing manganese dioxid or the other polyoxids of manganese, $Mn_2O_3$ and $Mn_3O_4$, or by manganese compounds at a lower stage of oxidation as manganese monoxid together with an oxidizing agent or a compound of the two such as manganese nitrate. Arsenious oxid in either pure form or in the form of commercial white arsenic may be used. The quantity of water present in the reaction mixture may vary, but the use of approximately the proportions indicated gives a slurry of suitable consistency for thorough mechanical agitation. Water may be added to the slurry from time to time to make up for that evaporated.

Lime is the preferred alkaline agent, since the calcium arsenate produced by the interaction of the lime and the manganese arsenate is insoluble and has insecticidal properties. Other alkalies sufficiently strong in their action to decompose manganese arsenate and form manganese hydroxid may be used.

The brown colored final product when treated with hydrochloric acid liberates chlorine and when treated with 1—1 nitric acid leaves an undissolved residue of manganese dioxid, while the white intermediate product of the reaction of manganese dioxid with arsenious oxid does not. This indicates that the lime treatment produces a marked change in the chemical composition of the intermediate product involving an oxidation reaction. But the soluble arsenic content of the final product is substantially the same as that of the intermediate product and special provision for the supply of oxygen is not required. The treatment with lime is of course carried out in an open receptacle and such oxygen as is necessary, if any, presumably is supplied from the atmosphere, but the supplying of more oxygen, for instance by blowing air into the slurry, does not appear to hasten the development of the brown color.

As has been indicated, the essential ingredient of the reaction of product of manganese dioxid and arsenious oxid is dimanganoarsenate, $MnHAsO_4$,—a white compound, and the process of my invention is particularly applicable for the treatment of this reaction product. The process is applicable, however for the treatment of arsenates of manganese singly or mixtures of two or more of them, pure or impure, made in any other way, and such applications of the process are embraced by my invention.

I claim:—

1. Process which comprises digesting a mixture containing an arsenate of manganese and an alkaline agent in the presence of water.

2. Process which comprises digesting a mixture containing an arsenate of manganese and an alkaline calcium compound in the presence of water.

3. Process which comprises digesting an arsenate of manganese with calcium hydroxide in the presence of water.

4. Process which comprises heating an aqueous slurry of a material containing an arsenate of manganese and an alkaline agent to a temperature in the neighborhood of 100° C.

5. Process which comprises heating and agitating a mixture of a material containing an arsenate of manganese and calcium hydroxide in the presence of water in quantity sufficient to form a slurry to a temperature in the neighborhood of 100° C. in the presence of air.

6. Process which comprises heating and agitating a slurry of pyrolusite and arsenious oxide with water in the presence of a catalyst at a temperature approaching 100° C. until reaction is substantially complete, adding an alkaline calcium compound and digesting the mixture.

7. Process which comprises heating dimanganoarsenate with an alkaline agent.

8. Process which comprises heating a slurry of manganese dioxid and arsenious oxid with water until reaction is substantially complete and heating the insoluble product so produced with calcium hydroxide in the presence of water.

9. Process which comprises mixing the reaction product of pyrolusite and white arsenic with lime in quantity amounting to about 10% of the combined weights of the pyrolusite and white arsenic, and digesting the mixture with water until it is transformed into a dark brown colored product.

10. As a new product a brown-colored insecticide comprising substantially a mixture of a manganese arsenate, calcium arsenate and hydrated manganese oxide.

11. A material suitable for use as an insecticide comprising an arsenate of manganese and a brown colored manganese compound.

12. An insecticidal material comprising an arsenate of manganese and an arsenate of an alkali forming metal.

13. An insecticidal material comprising an arsenate of manganese and an arsenate of an alkaline earth metal.

14. An insecticidal material comprising an arsenate of manganese and calcium arsenate.

15. An insecticidal material comprising an arsenate of manganese and a relatively small proportion of an arsenate of an alkali forming metal.

16. As an insecticidal material a brown colored material comprising an arsenate of manganese and an insoluble arsenate of another metal.

17. As a new product a brown-colored insecticide comprising a manganese arsenate, a substantially insoluble alkaline earth metal arsenate and hydrated manganese oxide, being substantially identical with the product obtained by treating a material containing a manganese arsenate with an alkaline earth metal hydroxide.

In testimony whereof, I affix my signature.

HARRY P. CORSON.